United States Patent [19]

Nagata

[11] Patent Number: 5,011,109
[45] Date of Patent: Apr. 30, 1991

[54] SUSPENSION DEVICE FOR SEAT

[75] Inventor: Kojiro Nagata, Akishima, Japan

[73] Assignee: Tachi-S Co., Ltd., Tokyo, Japan

[21] Appl. No.: 324,076

[22] Filed: Mar. 16, 1989

[51] Int. Cl.[5] ............................................. F16M 13/00
[52] U.S. Cl. .................................... 248/564; 248/578; 248/588; 248/608; 297/345
[58] Field of Search ............... 248/560, 562, 564, 566, 248/575, 576, 578, 580, 584, 588, 586, 590, 669, 157, 419, 420, 421, 608; 297/345

[56] References Cited

U.S. PATENT DOCUMENTS

| | | | |
|---|---|---|---|
| 2,680,472 | 6/1954 | Hempe, Jr. | 248/578 |
| 3,006,593 | 10/1961 | Plate | 248/575 |
| 3,608,855 | 9/1971 | Osenberg | 248/419 |
| 3,756,552 | 9/1973 | Wilhelms | 248/575 |
| 3,853,296 | 12/1974 | Forssell | 248/421 |
| 4,640,488 | 2/1987 | Sakamoto | 248/588 |
| 4,729,539 | 3/1988 | Nagata | 248/608 |
| 4,784,434 | 11/1988 | Iwami | 297/345 |

Primary Examiner—Ramon O. Ramirez
Assistant Examiner—Robert A. Olson
Attorney, Agent, or Firm—Browdy and Neimark

[57] ABSTRACT

A suspension device for seat which includes a torsion bar interposed between an upper movable frame and a lower base frame, the torsion bar being adapted to bias the upper movable frame upwardly, and a spring provided on a shock absorber which is extended between the upper movable and lower base frames. The repercussive force of the suspension device is increased by the torsion bar and spring, against a downward load applied on the seat.

3 Claims, 2 Drawing Sheets

SUSPENSION DEVICE FOR SEAT

BACKGROUND OF THE INVENTION

1. Field of the Invention

The present invention relates to a suspension device for a vehicle seat (especially for an automotive seat), and particularly is concerned with a suspension device of this kind which is provided with a weight adjusting mechanism.

2. Description of the Prior Art

There has been available a seat suspension device of the type equipped with a weight adjusting mechanism for the purpose of enabling an occupant to adjust an optimum seating height of the seat according to his or her weight.

The suspension device of this kind is interposed between the seat and floor of an automobile, comprising a base lower frame fixed on the floor, a movable upper frame fixed to the seat, an elastic torsion bar provided between the two lower and upper frames, and an adjusting means for adjustably varying the repercussive force of the torsion bar to effect the weight adjustment.

In this ordinary structure, a downward load, i.e. a weight of the occupant, is directly applied to the torsion bar. However, the torsion bar per se, which is generally employed in this suspension device, is limited in tolerable amount of load absorbing rate, providing as small as about 90 kg/15 mm for weight adjustment range. To compensate for this deficiency, it might be proposed that the torsion bar is formed greater in thickness or diameter, but it will impair a cushioning effect of the seat suspension device and also require a greater force to operate the adjusting means in adjusting the repercussive force of the torsion bar according to the weight of the occupant. Consequently, this conventional suspension device has remained defective in its operationability and cushioning effect.

SUMMARY OF THE INVENTION

It is a purpose of the present invention to provide a suspension device for seat which permits for increase of its repercussive force against a weight of occupant thereon without impairing its cushioning effect and which is adjusted in the repercussive force with a small force.

In achievement of such purpose, the present invention includes not only a torsion bar but also a spring as a means for providing an increased repercussive force against a weight of occupant on the seat. Namely, in accordance with the invention, the torsion bar is interposed between an upper movable frame and a lower base frame so as to bias the former frame upwardly elastically, with an adjusting device equipped with the torsion bar, and further the spring is provided on a shock absorber which is extended between the upper movable and lower base frames.

Accordingly, a downward load, i.e. a weight of occupant, is received by both torsion bar and spring, whereby the repercussive force of the suspension device is increased against the downward load, and therefore, reduced is an operation force for operating the adjusting device, which enables the occupant to adjust the repercussive force with a small force.

It is another purpose of the present invention to permit a fine adjustment for the repercussive force of the suspension device.

To this end, in accordance with the invention, in addition to the above-stated adjusting device for the torsion bar, there is provided an adjusting mechanism on the shock absorber, which is adapted for adjustment of the spring there. The adjusting mechanism comprises a rotatable ring attached idly about the shock absorber, a cylindrical guide piece integral with the rotatable ring, the cylindrical guide piece having, formed at its lower end, a series of wavy notches each having different level in valley, and a stopper which is to be engaged with one of the notches. Such adjusting mechanism is movably disposed under and contacted with the spring. Thus, the rotation of the rotatable ring causes disengagement of the stopper from one of the notches and then engagement of the same with another of the notches which is different in level of its valley, whereby due to the difference in valley level of notches, the adjusting mechanism causes the extension or compression of the spring, so as to vary the repercussive force of the spring.

Accordingly, the repercussive force of the suspension device is adjusted finely by operation of the two adjusting elements: the adjusting device for the torsion bar and the adjusting mechanism for the spring of the shock absorber.

DETAILED DESCRIPTION OF PREFERRED EMBODIMENT OF THE INVENTION

Figure 1:
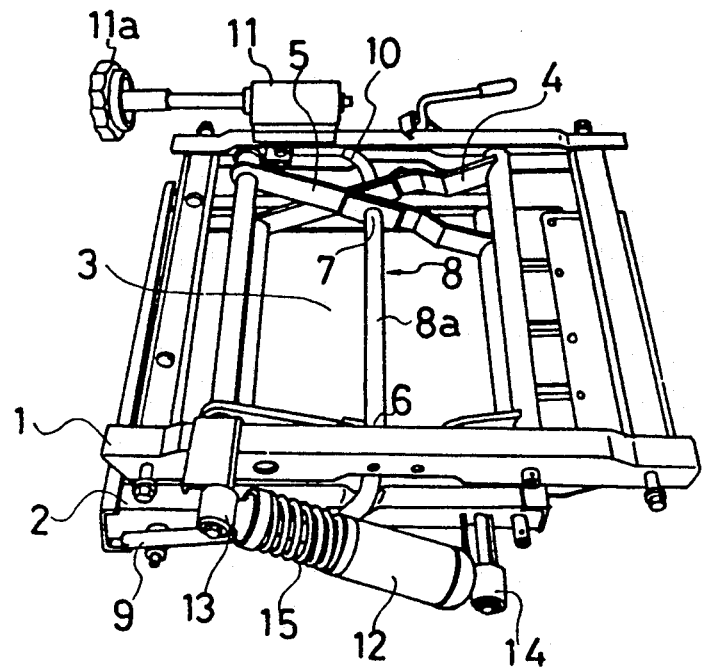
FIG. 1 is a perspective view of a seat framework in which provided is a suspension device in accordance with the present invention.
Figure 2:
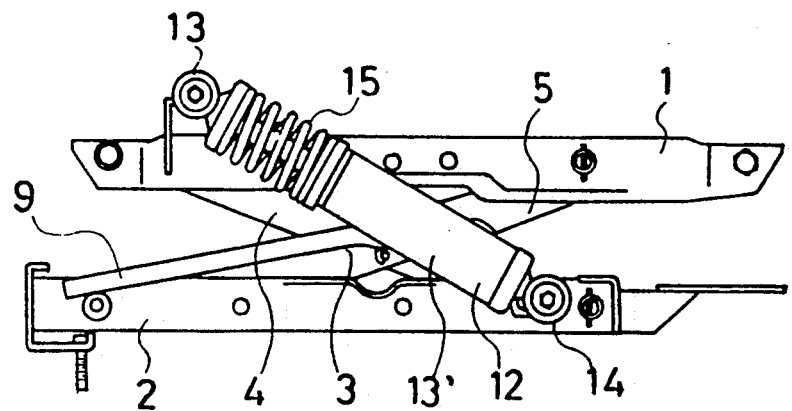
FIG. 2 is a side view of the seat framework as in the FIG. 1.

Referring to FIGS. 1 and 2, there is illustrated a principal part of framework forming an automotive seat which is provided with a suspension device of the present invention.

Designations (1) and (2) denote an upper movable frame and a lower base frame, respectively. Although not shown, the lower base frame (2) is fixed on the floor of an automobile and, upon the upper movable frame (1), is secured a seat cushion.

Between the upper movable and lower base frames (1)(2), are provided a pair of X-shaped links (a)(a) each being composed of two link members (4)(5) in a rotatably crossed manner, such that the upper ends respectively of the link members (4)(5) are rotatably, pivotally connected to the upper movable frame (1) and the lower ends respectively of them are likewise connected to the lower base frame (2). Thus, the upper movable frame (1) is movable vertically with respect to the lower base frame (2) via the pair of X-shaped links (a)(a).

An elastic torsion bar (8) of generally "U" shaped configuration is extended between the pair of X-shaped links (a)(a), having a first end portion (9) and a second end portion (10), both of which end portions (9)(10) are oriented in a direction forwardly of the framework, extending at a right angle from the central portion (8a) of the torsion bar (8), as shown. The first end portion (9) is directed upwardly and connected with an adjusting device (11) provided at the upper movable frame (1), whereas the second end portion (10) is directed downwardly and secured at the lower 10 base frame (2). Both end parts of the central portion (8a) of the torsion bar (8) pass through the central crossed points of the X-shaped links (a)(a), respectively. With such torsion bar (8), the upper movable frame (1) is normally biased upwardly in an elastical way.

The adjusting device (11) is adapted for adjusting the torsion force, or repercussive force of the torsion bar (8) against the upper movable frame (2), and has an operation handle (11a). Therefore, the operation of the handle (11a) permits adjustment of height of upper movable frame (2) according to the weight of an occupant who sits on the seat cushion thereon.

As seen in FIG. 1, there is provided a shock absorber (12) laterally of the upper movable and lower base frames (1)(2), such that the shock absorber (12) per se is extended between the two frames (1)(2) in an inclined manner, with its upper end (13) and lower end (14) being rotatably, pivotally connected to the forward end portion of the upper movable frame (1) and the rear end portion of the lower base frame (2), respectively. Such arrangement of the shock absorber (12) results in allowing the lowest possible movement of the upper movable frame (1) towards the lower base frame (2) without hindrance of the shock absorber (12), and is advantageous in widening the vertical movement range of the upper movable frame (1).

Figure 3:
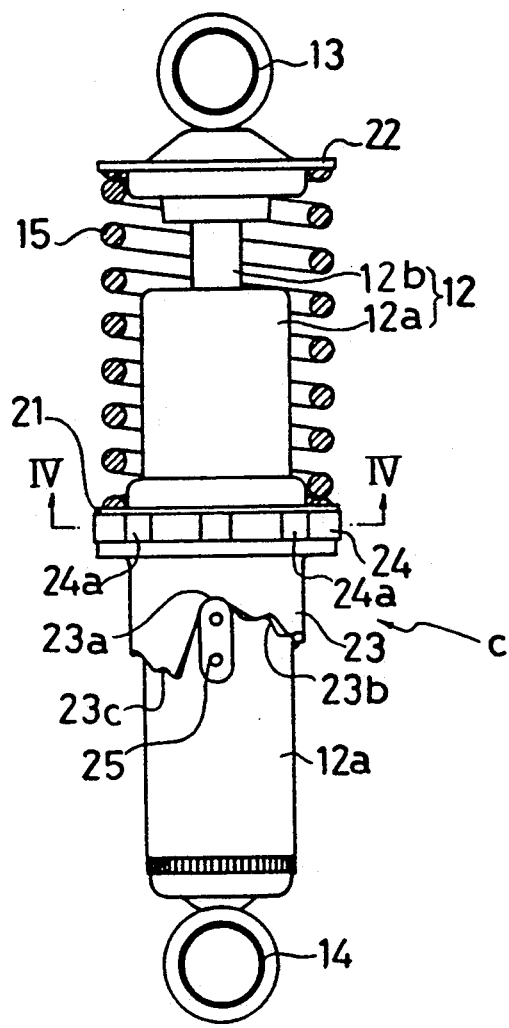
FIG. 3 is a partially broken plan view of a shock absorber in the suspension device, in which provided are a spring and adjusting mechanism for adjustment of the spring.
Figure 4:
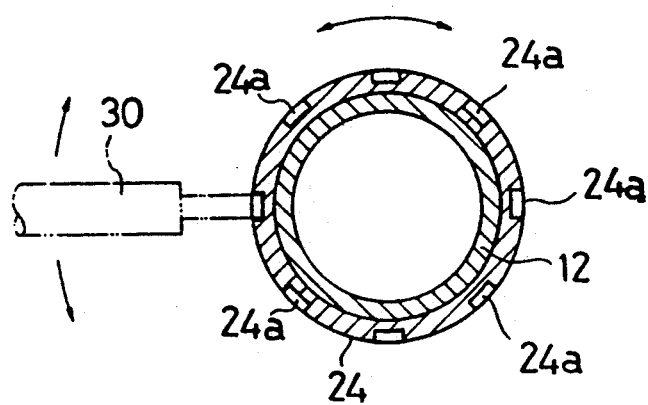
FIG. 4 is a sectional view taken along the line IV—IV.

Having regard to the shock absorber (12), by referring to FIGS. 3 and 4, specifically, it is constructed by a cylinder (12a) and a piston rod (12b), with a spring (15) being wound around the upper portion of the shock absorber (12), and an adjusting mechanism (C) for adjusting the repercussive force of the spring (15) is provided on the shock absorber (12). The spring (15) is supported at its upper and lower ends by an upper support piece (22) and a lower support piece (21), respectively. The lower support piece (21) is slidably attached about the cylinder (12a) such as to be movable in a coaxial, longitudinal direction of the shock absorber (12). The adjusting mechanism (C) is disposed under that lower support piece (2!), and comprises a rotatable ring (24) attached idly about the cylinder (12a), the rotatable ring (24) having a plurality of holes (24a) formed circumferentially thereof, a cylindrical guide piece (23) connected integrally with the rotatable ring (24), the cylindrical guide piece being idly attached about the cylinder (12a), whereupon both rotatable ring (24) and cylindrical guide piece (23) are free to move slidingly in a coaxial, longitudinal direction of the shock absorber (12) and to rotate therearound, the cylindrical guide piece (23), further, having, formed at its lower end, a series of irregular, wavy notches (23a, 23b, 23c ...) which are varied in level of their respective valleys, and a stopper (24) to be engaged with one of those notches, the stopper (24) being secured on the cylinder (12a) of the shock absorber (12). It is noted that the holes (24a) are adapted for insertion thereinto of a jig (30) (See FIG. 4) in order to facilitate the ease with which the rotatable ring (24) is rotated for actuating the adjusting mechanism (C), as will be explained below.

With this adjusting mechanism (C), as shown in FIG. 4, the jig (30) is inserted into one of the holes (24a) and, when the rotatable ring (24) is caused to rotate by rotation of the jig (30), one of the notches is disengaged from the stopper (24) and another of them with a different level is engaged therewith, whereby the difference in level of the notches results in the upward or downward movement of the upper end of the the rotatable ring (24), thus that of the lower support piece (21), which in turn causes the expansion or compression of the spring (15), to therey vary the repercussive force of the spring (15). To facilitate understanding in this respect, referring to FIG. 3, when the rotatable ring (24) is rotated, using the jig (30), in the arrow direction, from the initial point where the stopper (25) is engaged with the first notch (23a) having a highest level of its valley, towards another point where is disposed the second notch (23b) having a lower level of its valley than that of the first notch (23a, the upper end of the rotatable ring (24) is brough to a lower level, whereby the spring (15) expands itself and thus its repercussive force becomes weaker to produce a soft cushioning effect to the shock absorber (12). In the case of the stopper (25) being engaged into the third notch (23c) having a lowest level in its valley, it is seen that the shock absorber (12) is given a most soft cushioning effect.

Accordingly, by operating thus-constructed adjusting mechanism (C) of the shock absorber (12), the seat cushion on the upper movable frame (1) can be adjusted in height via the spring (15) as well, according to the weight of an occupant sitting on the seat.

From the above description, it is appreciated that the upper movable frame (1) is elastically supported by the torsion bar (8) and the spring (15) associated with the shock absorber (12), which is greatly effective in dispersing a downward load applied to the upper movable frame (1) and thus reducing a direct downward load upon the torsion bar (8), whereby reduced is a force required for operating the adjusting device (11). Consequently, a cushioning effect is amplified in the seat, owing to the increased repercussive force produced by such dual elastic structure, i.e. the torsion bar (8) and spring (15), and an occupant adjusts the seating height, with a small force, according to his or her weight. Furthermore, the spring (15) serves to absorb a great downward load and transmit a decreased load to the shock absorber (12), thereby protecting the latter. The shock absorber (12) is therefore used for long period of time, as compared with the aforementioned prior art. Still further, a more fine adjustment for seating height can be attained due to the provision of the adjusting mechanism (C) in addition to the adjusting device (11) for the torsion bar (8), which permits an occupant to make a fine adjustment for a most preferred seating height to his or her full satisfaction.

Finally, it should be understood that the present invention is not limited to the illustrated embodiment, abut any other modifications, replacements and additions may structurally be possible without departing from the scopes and spirits of the appended claims.

What is claimed is:

1. A suspension device for seat, comprising:
   an upper movable frame;
   a lower base frame fixed to a floor;
   an X-shaped link means provided between said upper movable and lower base frame;
   a torsion bar adapted to bias said upper movable frame in an upward direction;
   a means for adjusting a repercussive force of said torsion bar;
   a shock absorber arranged between said upper movable and lower base frames, said shock absorber being provided with a spring which is adapted to bias said upper movable frame in an upward direction;

whereby said shock absorber spring adjusts the repercussive force of said torsion bar on said movable frame;

wherein, on said shock absorber, is provided an adjusting mechanism for adjusting a repercussive force of said spring, such that said adjusting mechanism is disposed under and contacted with said spring and is not only movable slidingly on said shock absorber in a coaxial, longitudinal direction thereof, but also rotatable around said shock absorber, and wherein said adjusting mechanism includes a limited number of engagement portions which provide a limited number of discrete engagement levels, and a stopper secured on said shock absorber, said stopper being to be engaged with one of said engagement portions, whereby engagement of said stopper with the different levels of said stopper with the different levels of said engagement portions causes extension and compression of said spring, to thereby adjust said repercussive force of said spring; and wherein said adjusting mechanism comprises a rotatable ring attached idly about said shock absorber, a cylindrical guide piece integral with said rotatable ring, said cylindrical guide piece being idly attached about said shock absorber, whereby both rotatable rings and cylindrical guide piece are free to move in a coaxial, longitudinal direction of said shock absorber and to rotate about said shock absorber, and said engagement portions of said adjusting mechanism comprise a plurality of irregular, wavy notches which are formed at a lower end of said cylindrical guide piece and are varied in level of their valleys.

2. The suspension device according to claim 1, wherein said rotatable ring is formed with a plurality of holes at its circumference, whereby a jig is inserted into one of said holes in order to facilitate ease with which said rotatable ring is rotated for actuating said adjusting mechanism.

3. A suspension device for seat, comprising:
an upper movable frame;
a lower base frame fixed to a floor;
an X-shaped link means provided between said upper movable and lower base frames;
a torsion bar connected with and disposed between said upper and lower base frames, by means of which said upper movable frame is given a repercussive force to resiliently resist against a weight of an occupant thereon;
a shock absorber connected with and disposed between said upper movable and lower base frames, such that said shock absorber is located outwardly of said two frame;
an adjusting means for adjusting said repercussive force of said torsion bar, said adjusting means being provided at said shock absorber, and
wherein said adjusting mechanism comprises a rotatable ring attached idly about said shock absorber, a cylindrical guide piece integral with said rotatable ring, said cylindrical guide piece being idly attached about said shock absorber, whereby both rotatable ring and cylindrical guide piece are free to move in a coaxial, longitudinal direction of said shock absorber and to rotate about said shock absorber, and said engagement portions of said adjusting mechanism comprise a plurality of irregular, wavy notches which are formed at a lower end of said cylindrical guide piece and are varied in level of their valleys.

* * * * *